(12) United States Patent
Wooten

(10) Patent No.: US 6,542,946 B1
(45) Date of Patent: Apr. 1, 2003

(54) DUAL MODE DIFFERENTIAL TRANSCEIVER FOR A UNIVERSAL SERIAL BUS

(75) Inventor: David R. Wooten, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/493,322

(22) Filed: Jan. 28, 2000

(51) Int. Cl.[7] .............................................. G06F 13/42

(52) U.S. Cl. ....................................... 710/106; 710/64

(58) Field of Search ................................ 710/106, 105, 710/310, 64

(56) References Cited

U.S. PATENT DOCUMENTS

| | | | | |
|---|---|---|---|---|
| 6,145,039 A | * | 11/2000 | Ajanovic et al. | ............ 710/105 |
| 6,279,060 B1 | * | 8/2001 | Luke et al. | .................... 710/10 |
| 6,389,501 B1 | * | 5/2002 | Garney et al. | .............. 710/310 |

* cited by examiner

Primary Examiner—Glenn A. Auve
Assistant Examiner—David S Glass
(74) Attorney, Agent, or Firm—Conley Rose, P.C.

(57) ABSTRACT

A computer system has a USB bus to which one or more USB-compatible devices can connect. One or more of the USB devices has an electrical interface that includes two transmitters and, if desired, a receiver for bidirectional data transmission. The transmitters preferably are dual output, differential transmitters. The transmitters include a slower transmitter and a faster transmitter. The faster transmitter can transmit data at a rate that is faster than the slower transmitter. The electrical interface also includes an electrical termination device that is disposed between the output terminals of the two transmitters. The termination device preferably comprises a pair of multi-purpose termination resistors that can provide serial termination or parallel termination depending whether the fast or slow transmitter is used. When transmitting using the slower transmitter, the receiving USB device disables all of its transmitters and the transmitting USB device disables the output of the faster transmitter by deasserting an output enable (OE) signal to the faster transmitter. The termination device provides serial termination and the data from the slower transmitter passes through the termination device. When transmitting using the faster transmitter, both receiving and transmitting USB devices assert single ended zero (SE0) signals to their slower transmitters which forces both of the slower transmitters' output signals to a low impedance state. In this latter transmission mode, the termination device provides parallel termination, effectively functioning as a "pull-down" terminator. With parallel termination, echoes effectively are reduced or eliminated and faster data rates are thereby attainable than are generally possible with serially-terminated transmission lines.

22 Claims, 2 Drawing Sheets

DUAL MODE DIFFERENTIAL TRANSCEIVER FOR A UNIVERSAL SERIAL BUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to connections between devices in computer systems. More particularly, the invention relates to connections between peripheral devices via Universal Serial Bus ("USB"). Still more particularly, the invention relates to a dual mode differential transceiver for use in a USB to permit both full speed and high speed data transfers to occur.

2. Background of the Invention

Conventional computer systems usually require a variety of peripheral devices to be connected to the computer chassis by a cable. Examples of peripheral devices (often referred to simply as "peripherals") include the monitor, keyboard, external modem, plotter, printer, mouse, joystick, trackball, speakers and other devices. Traditionally, each of the peripheral devices connects to the chassis through any one of a variety of different types of cables. A chassis has a number of connectors typically on a rear panel. These connectors generally include serial connectors, parallel connectors, Small Computer System Interface ("SCSI") connectors, and various other standard or custom connectors. Some devices connect via a serial cable to the serial connector, while other devices connect to the parallel connector. Other devices, like the keyboard, connect to special purpose connectors.

There are a number of disadvantages with this peripheral device connection scheme. For example, dedicated cables for each peripheral device can make connecting peripheral devices to the chassis cumbersome and inconvenient. Sometimes, the user will not have the particular cable necessary to connect a desired device.

Many peripheral devices require the installation of associated expansion cards into the computer chassis. This process is highly undesirable for many users who have no desire to open the cover of the chassis. Furthermore, once a conventional computer has been turned on and has completed its initialization process ("boot-up"), such computers normally will not communicate with any new devices that are connected post boot-up. That is, all peripherals must be connected to the computer before the computer boots-up.

To address these and other concerns, the Universal Serial Bus ("USB") standard was introduced. The USB generally provides a solution for attaching peripherals that address the above-noted problems while balancing performance and cost. Devices attached to the USB ports can include additional connections for attaching other USB devices. For example, a keyboard may connect to the chassis via a USB cable to a USB connection on the computer chassis. The keyboard also has one or more additional USB connections to permit a mouse to connect to the keyboard. Thus, USB-compatible peripheral devices can be linked together making connection of peripherals easier than with conventional computer systems. USB provides other benefits such as the ability to support "plug and play." Plug and play means that a device can be connected to a computer that has already been booted-up and the device will automatically be configured and be ready for immediate use.

The current USB specification (USB 1.1) imposes a maximum data rate of 12 megabits per second (Mb/s). That is, the maximum rate at which two or more devices can communicate with each other over a USB cable is 12 Mb/s. While this maximum rate may be acceptable for a keyboard, in which the limiting factor usually is the substantially lower speed at which a human can type, the maximum rate can be a problem for higher bandwidth types of operations such as transmitting data from a scanner.

The connection path between a device transmitting data and another device receiving the data is a transmission line. The type of the transmission line is often characterized by the electrical termination. In accordance with well-known principles of electrical circuit theory, one or both ends of the transmission line usually include one or more passive electrical devices, typically resistors. The resistors "terminate" the transmission line to minimize signal reflections and improve signal integrity.

Data is transmitted across a USB cable in a digital format in which a voltage changes between two states, e.g., 0 volts and 3.3 volts. The change in voltage between these states is referred to as a signal transition. The USB standard requires "source" termination which means termination resistors are connected in series with the output terminals of the transmitters (i.e., the source of the signal). Source termination, which is required by USB 1.1, results in a signal transition being transmitted through the USB cable and a portion of the energy that comprises that signal is reflected back to the sending device. Because of the reflection, the USB 1.1 serial termination scheme precludes the sending device from changing the state of signal to be transmitted over the cable until the reflection from the previous transition has reflected back to the sending device. Electrical signals propagate along a cable at a predetermined speed. USB 1.1 is specified for a maximum cable length of 5 meters. With this length of cable and given the amount of time a signal will take to travel down a 5 meter cable and back, the maximum data rate that is permissible under USB 1.1 is 12 Mb/s data. Data rates faster than 12 MB/s second will cause reflected signals to interfere with subsequent signal transitions and result in loss of data.

For some types of peripheral devices, it is highly desirable to be able to transfer data at rates faster than what is permitted by USB 1.1. At the same time, it would be desirable for the computer to still accommodate USB peripherals constructed in accordance with 12 Mb/s USB 1.1 protocol. This would permit both slower USB 1.1 devices or faster USB devices to be connected to the same computer system. Despite the advantages such a system would provide, to date no system is known which can accommodate USB 1.1 and devices capable of communicating at faster data rates.

BRIEF SUMMARY OF THE INVENTION

The problems noted above are solved in large part by a computer system having a bus to which one or more devices, such as peripheral devices, connect. The bus may be, for example, a Universal Serial Bus ("USB") and the devices connected to it are USB-compatible devices. A USB host/controller controls the USB bus. One or more of the USB devices and/or the host controller have an electrical interface that includes two transmitters and a receiver for bidirectional data transmission. At least one transmitter preferably is a slower large amplitude, differential transmitter and the other is a faster differential transmitter in which the data signal is ground referenced. The faster transmitter can transmit data at a rate that is faster than the slower differential transmitter. The electrical interface also includes an electrical termination device that is disposed between the output terminals of the two transmitters. The termination device preferably comprises a pair of multi-purpose termination resistors that advantageously can provide serial termination or parallel termination depending whether the fast or slow transmitter is used.

When transmitting using the slower transmitter, which is used to communicate in accordance with the USB 1.1 specification, the transmitting USB device disables the output of its faster transmitter by deasserting an output enable (OE) signal to the faster transmitter. The receiving USB device disables all of its transmitters. In this slower communication mode, the termination device plus the output impedance of the slower transmitter provides serial termination and the data from the slower transmitter passes through the termination device to the destination device. When transmitting using the faster transmitter, both USB devices assert single ended zero (SE0) signals to their slower transmitters which forces both of their output signals to a low impedance state. In this latter slower transmission mode, the termination device, connected to the outputs of the slower transmitter which are forced low, provides parallel termination, effectively functioning as a "pull-down" terminator. With parallel termination at the destination end, echoes effectively are reduced or eliminated and faster data rates are thereby attainable. Further, a USB device with such a multi-purpose electrical interface is compatible with the existing USB 1.1 specification, but can also be used to transmit and receive at faster data rates than are permissible under the USB 1.1 specification.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
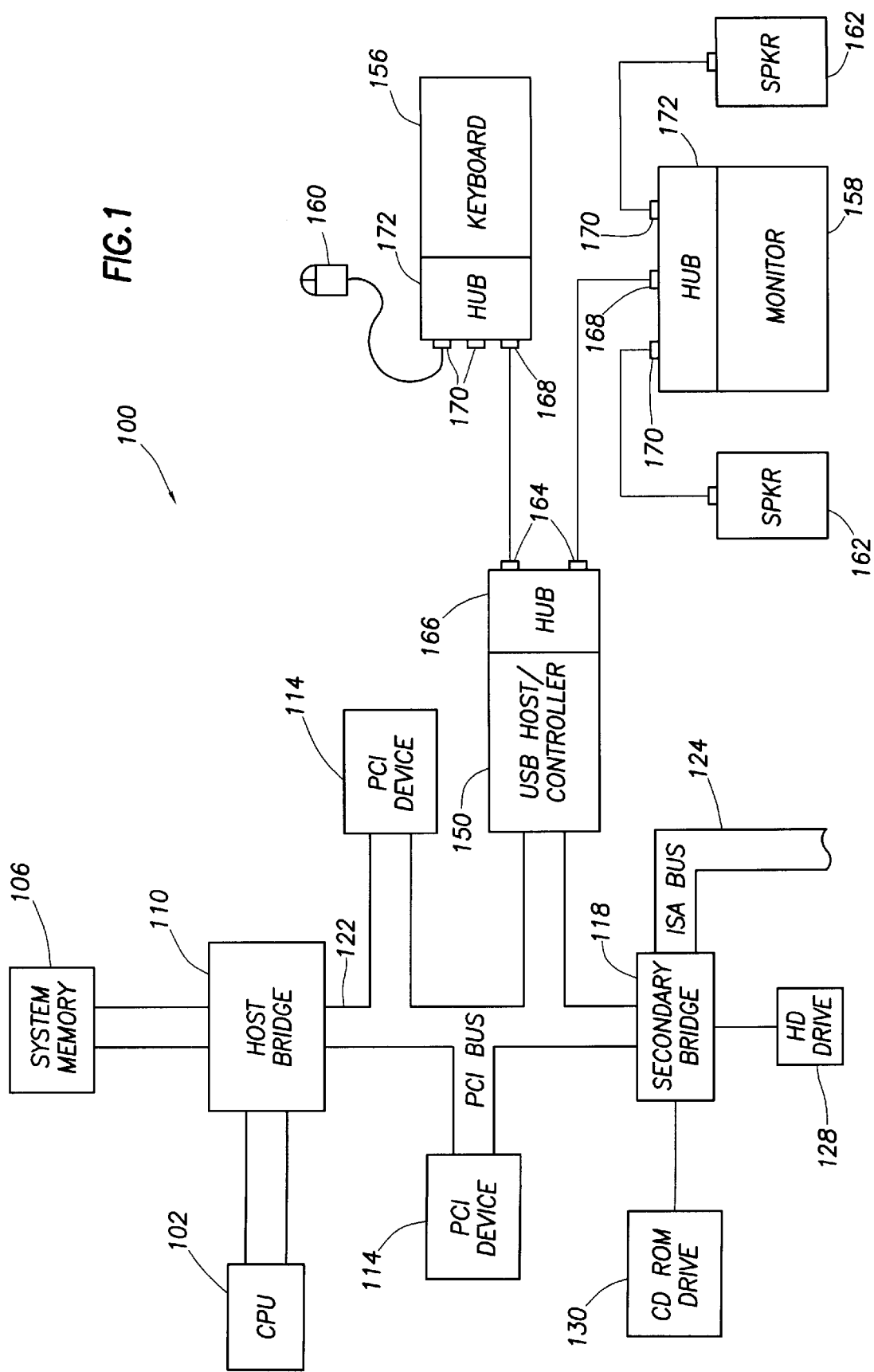
FIG. 1 shows a computer system in accordance with a preferred embodiment of the invention and having a USB bus that can accept peripheral devices that require termination in accordance with the USB 1.1 requirements and other peripheral devices that have an alternative form of termination that permits faster data rates.

Referring now to FIG. 1, a computer system 100 constructed in accordance with a preferred embodiment of the invention generally comprises a central processing unit ("CPU") 102 coupled to system memory 106 through a host bridge device 110. It should be understood that other embodiments of the invention may include more than one CPU (e.g., 2, 3, 4). The CPU may be any suitable microprocessor such as the Pentium II® or Pentium III® by Intel®. The system memory 106 preferably comprises one or more memory devices such as any suitable type of random access memory. System memory may comprise, for example, synchronous dynamic random access memory ("SDRAM"). The host bridge 110 permits the CPU 102 and other devices in computer system 100 to read data from or write data to system memory 106.

The host bridge 110 also has an interface to a system or peripheral bus 122. In the preferred embodiment shown in FIG. 1, host bridge 110 interfaces to a Peripheral Component Interconnect ("PCI") bus. Various PCI-compliant devices 114 connect to the PCI bus 122. Through host bridge 110, the CPU 102 can communicate with PCI devices 114 (e.g., a modem, a network interface card), and PCI devices 114 can read data from and write data to system memory 106 via the host bridge. The host bridge 110 preferably contains a memory controller and arbiter (not specifically shown) to provide controlled and efficient access to system memory 106 by the various devices in computer system 100 such as CPU 102 and PCI devices 114.

Computer system 100 preferably also includes a secondary bridge device 118 which bridges PCI bus 122 to another bus such as an Industry Standard Architecture ("ISA") bus 124. Other devices, such as a hard disk drive 128 and CD ROM 130, couple to secondary bridge device 118. Drives 128, 130 can be accessed by the CPU 102, for example, through secondary bridge 118. One of ordinary skill in the art will recognize that one or more disk drive controllers (not shown) may also be included to provide effective data transfers to and from drives 128, 130.

Referring still to FIG. 1, computer system 100 preferably also includes a USB controller 150 to which various USB compatible peripheral devices couple. The exemplary USB peripheral devices shown in FIG. 1 include a keyboard 156, monitor 158, mouse 160, and speakers 162, although fewer peripheral devices are acceptable. If desired, additional peripheral devices, such as a printer and scanner, can be added to computer system as desired 100.

In accordance with the USB specification, USB devices connect to one another via "ports." Accordingly, the USB host controller 150 includes a pair of "root" ports 164 that, as shown in FIG. 1, connect via cables to corresponding ports 168 on the hub in the keyboard 156 and the hub in the monitor 158. Similarly, the keyboard 156 and monitor 158 include "downstream" ports 170 which connect via USB cables to a mouse 160 and speakers 162. As shown, the USB communication scheme advantageously permits devices to be linked together, without each peripheral device requiring a direct connection to the computer chassis.

The USB host controller 150 includes a "root hub" 166 that includes the electrical components necessary to activate, configure and control the ports 164. Those USB devices, such as the keyboard 156 and monitor 158, that include downstream ports to connect to other USB devices, also include a hub 172 to activate, configure and control the downstream ports 170 and communications with the mouse 160 and speakers 162.

In accordance with the preferred embodiment of the invention, the USB subsystem shown in FIG. 1 permits communications to occur in accordance with the USB 1.1 standard with its 12 Mb/s data rate limit, or at faster rates if desired. Further, either USB 1.1 devices or devices that may be constructed in accordance with other types of USB standards capable of communicating at faster data rates can be connected to computer system 100. The following discussion applies to USB devices capable of transmitting at speeds greater than the 12 Mb/s limit imposed by USB 1.1.

Figure 2:
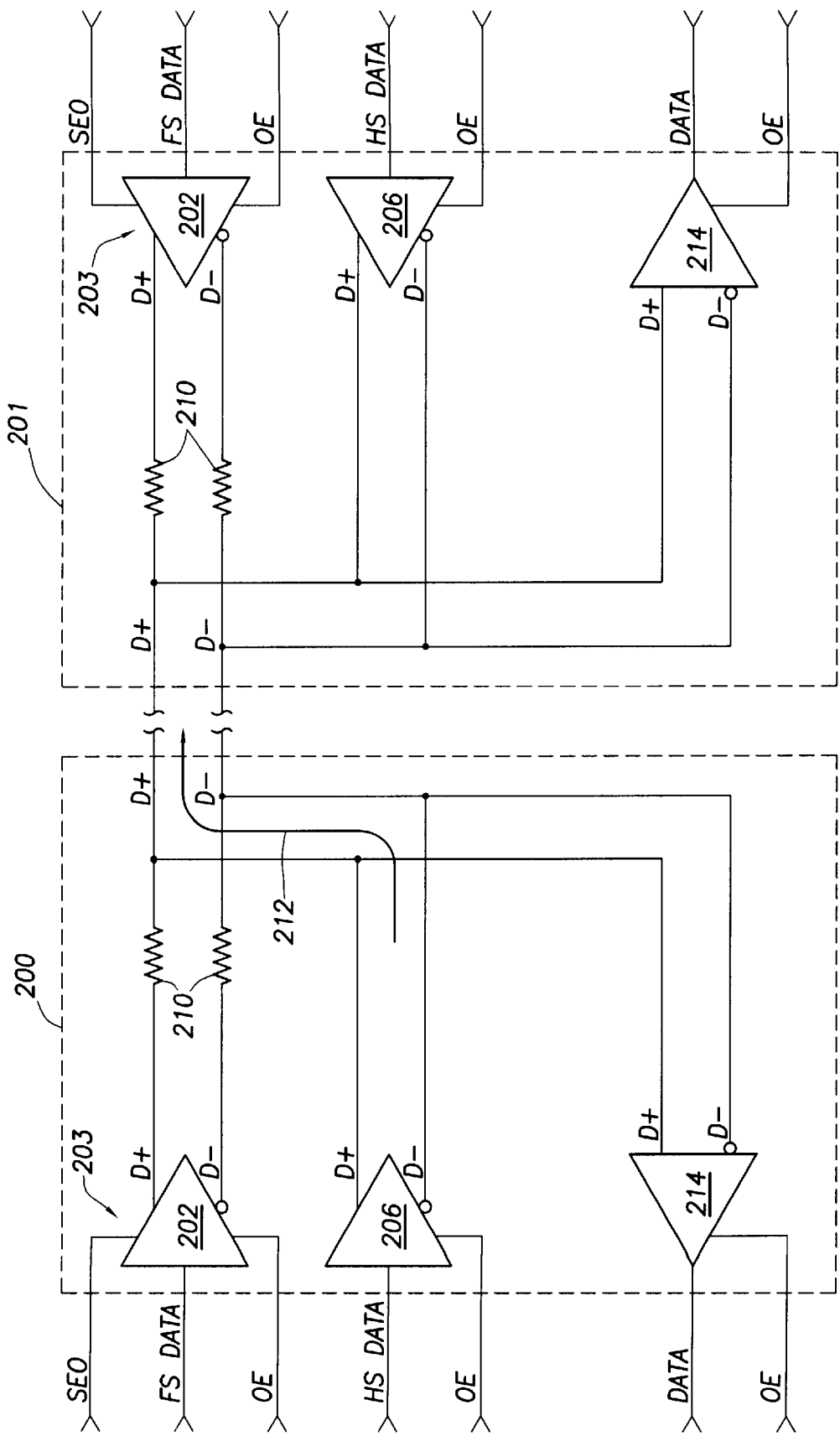
FIG. 2 shows an exemplary USB dual mode transceiver constructed in accordance with the preferred embodiment.

Referring now to FIG. 2, a pair of USB devices, devices 200 and 201, are shown connected with one another. As shown, each USB device is adapted to transmit either in accordance with USB 1.1 or at a faster rate depending on whether the other device can accommodate faster data rates. As shown in FIG. 2, at least one transceiver 203 is provided in each USB device in the pair of connected devices. Each transceiver 203 preferably includes two transmitter 202, 206 and one receiver 214. Transmitter 202 is a "full speed" transmitter to provide compliance with the USB 1.1 protocol (12 Mb/s or slower) and the other transmitter 206 is a "high speed" transmitter to permit data communications at rates faster than 12 Mb/s. Incoming data, whether full or high speed data, is received through receiver 214. Alternatively, separate receivers can be provided for each data speed transmission.

A termination device, which may be resistive elements such as a pair of termination resistors, preferably is also included within each USB device. In the example of FIG. 2, each USB device shown, 200 and 201, can transmit and receive and thus both devices include a pair of termination resistors 210. As will be discussed below, termination resistors 210 are used in two different termination schemes—one serial and the other parallel—to permit both full and high speed communications. Termination resistors 210 preferably are selected such that the combination of the series resistors plus the output impedance of the full speed transmitters substantially match the impedance of the USB cable. With common USB cables, the resistors preferably are in the range of about 29 to 44 ohms.

Each transmitter 202, 206 receives data on an input pin and generates a pair of differential output signals in accordance with know techniques. As is well-known to those of ordinary skill in the art, the differential signal pair includes D+ and D−, which represent the output data signal to the transmitter, which are 180 degrees out of phase. Differential signaling permits noise induced on the cable to be attenuated by a receiver having a sufficiently high common mode rejection. Transmitter 202 receives full speed data over the FS DATA line and transmitter 206 receives data over the HS DATA line. In the following explanation of the USB electrical interfaces and in the claims which follow, full speed transmitters may be referred to as a "slow" or "slower" transmitter and high speed transmitter 206 may be called a "fast" or "faster" transmitter. The terms "slow," "slower," "fast," or "faster" are not intended to connote absolute speed and should in no way limit the scope of the claims.

Both transmitters 202, 206 receive an output enable (OE) input control signal. When asserted by the associated control logic (not shown) that controls the transmitters, the output of the transmitter is enabled. When a transmitter's OE signal is deasserted, that transmitter effectively is shut off or disabled. In addition, full speed transmitter 202 receives a single ended zero (SE0) input signal. When the SE0 input signal is asserted by the associated hub, both output signals of transmitter 202, D+ and D−, are driven to a low impedance state. The SE0 input signal would normally be used to indicate the end of pack (EOP) condition to the receiving device when transmitting data. However, in accordance with the preferred embodiment of the invention, the SE0 input signal is used for a substantially different purpose which is to accommodate the use of both full speed and high speed transmitters. The use of the SE0 signal for this purpose will be explained below. Thus, the hubs 166, 172 (FIG. 1) can be connected to either full or high speed USB devices through the use of full or high speed transmitters 202, 206.

Preferably, each hub 166 and 172 will determine whether a full speed USB device or a high speed USB device is present using any suitable technique. One such technique is as follows. During reset signaling, a high speed capable device will send a short burst of data to the hub. A hub that is not high speed capable will not detect these transitions. A hub that is high speed capable will detect these transitions as an indication that the attached device is high speed capable. The high speed hub will set a status bit for the port to indicate that the port is running in high speed mode. Before the end of the nominal reset interval, the high speed capable hub will then signal that it is also high speed capable by sending high speed formatted data to the attached device. If the attached device does not see the high speed formatted data within a fixed interval after ending its high speed transitions, it assumes that the hub is not high speed capable and will turn off the output enable to the full speed driver and disable the high speed receiver.

In response to determining which type of USB device is connected to each hub, each hub configures its transceivers 203 accordingly as explained below. In accordance with the preferred embodiment of the invention, termination resistors 210 are used in at least two different ways depending on whether full speed or high speed transmitters are used. As such resistors 210 may be referred to as "multipurpose" termination resistors.

USB signaling is bi-directional and half-duplex (i.e., transmission in only one direction at a time). To permit half-duplex transmission, the receiving USB device must disable both of its transmitters (or its one transmitter if it only has one transmitter) when receiving data. Each transmitter is disabled by deasserting the OE signal to each transmitter. The high speed transmitter 206 in the transmitting device also is disabled by deasserting its OE input signal. As such, the termination resistors 210 in the transmitting device provide serial termination in accordance with the USB 1.1 standard. That is, the differential full speed data signals D+ and D− flow from the transmitting USB device through resistors 210 in the transmitting device and to the receiver 214 of the receiving USB device.

For communications between connected USB devices that can accommodate high speed transmissions (data rates that may be greater than 12 Mb/s), each USB device enables its high speed transmitter 206 when transmitting data by asserting that transmitter's OE signal while the receiving device disables its high speed transmitter by deasserting its OE signal. In addition, both USB devices assert their SE0 signals to force the differential output lines, D+ and D−, of both full speed transmitters 202 to a low impedance state. With a high speed transmitter 206 activated and the output state of both full speed transmitters at a low impedance, termination resistors 210, which connect to the output pins of full speed transmitter 202, advantageously now function as parallel termination devices. That is, termination resistors 210 effectively function as "pull-down" resistors to coupling the differential data lines from high speed transmitter 206 to approximately ground potentials. With parallel termination and the value of resistors 210 set so that the sum of the resistor value in series with the output impedance of the transmitter 202 is approximately equal to the impedance of the USB transmission cable, one of ordinary skill in the art should appreciate that there will be little or no reflections from the receiving USB device because the reflection coefficient is small. As such, data rates greater than 12 Mb/s are possible because the transmitting USB device need not wait to receive a reflection before causing and transmitting the next signal transition. That is, the transmitting device can change the state (high to low or vice versa) of the signal to be transmitted to the receiving device as soon as the receiving device receives the current signal transition.

Assuming in FIG. 2 that USB device 200 transmits data to USB device 201, in the high speed mode, the differential data from high speed transmitter 206 in device 200 is driven from that transmitter to receiving device 201 in the direction of arrow 212. Like device 200, device 201 also has its SE0 signal asserted forcing the output signals from its full speed transmitter 202 to the low impedance state. The parallel termination of signals sent by device 200 is provided by the resistors 210 and full speed receiver 202 at device 201.

The preferred embodiment of the invention thus permits virtually any speed USB device to be used in the computer system 100 and provides a configurable termination circuit to accomplish this result. The preferred embodiment shown in FIG. 2 is simple, requires relatively few parts, consumes relatively little power and can be implemented with relatively low cost.

The above discussion is meant to be illustrative of the principles and various embodiments of the present invention. Numerous variations and modifications will become apparent to those skilled in the art once the above disclosure is fully appreciated. For example, while the preferred embodiment of the invention has been illustrated regarding USB 1.1 and its 12 Mb/s data rate limitation, alternative embodiments of the invention may include other types of communication standards and data rate limitations as will be apparent to one of ordinary skill in the art after reviewing this disclosure. Additionally, although the "faster" transmitters can be, and usually are, used to transmit data at rates faster than 12 Mb/s (or whatever the applicable upper limit is for the slower transmitter), the faster transmitter can, if desired, be used to transmit data rates supported by the slower transmitter. It is intended that the following claims be interpreted to embrace all such variations and modifications.

What is claimed is:

1. A computer system, comprising:
   a CPU;
   a host bridge coupled to said CPU and providing an interface to a bus;
   a bus controller coupled to said host bridge via said bus;
   at least one peripheral device coupled to said bus controller; and
   wherein the bus controller and at least one peripheral device have electrical interfaces coupled to one another, each of said electrical interfaces having at least two transmitters, a first transmitter and a second transmitter, and a terminating device connected to each transmitter to provide serial termination for said first transmitter and to provide parallel termination for said second transmitter through said first transmitter.

2. The computer system of claim 1 wherein said termination device comprises a pair of resistive elements.

3. The computer system of claim 1 wherein each transmitter can be individually disabled by the assertion of an output enable signal coupled to the transmitter.

4. The computer system of claim 1 wherein one transmitter in the electrical interface is enabled to transmit data while the other transmitter in the electrical interface is disabled.

5. The computer system of claim 2 wherein each transmitter has differential output signals that are connected to said pair of resistors.

6. The computer system of claim 5 wherein the first transmitter comprises a slower transmitter and the second transmitter comprises a faster transmitter, wherein the faster transmitter is capable of transmitting data at a faster rate than the slower transmitter.

7. The computer system of claim 6 wherein the slower transmitter has a SE0 input that, when asserted, forces both differential output signals to a low state to permit the resistors to function as pull down resistors.

8. The computer system of claim 7 wherein said electrical interface transmits data at a fast rate by asserting the SE0 input signal to the slower transmitter and transmitting data through the faster transmitter, and at a slow rate by disabling the faster transmitter and transmitting data through the slower transmitter.

9. The computer system of claim 8 wherein the pair of resistors provide parallel termination when the electrical interface transmits at the faster rate and provide serial termination when the electrical interface transmits at the slower rate.

10. A computer system having a universal serial bus (USB), comprising:
    a USB host/controller; and
    a USB-compatible peripheral device coupled to said USB host/controller, said peripheral device having:
       a dual output differential faster transmitter and a dual output differential slower transmitter, the faster transmitter adapted to transmit data at a faster rate that the slower transmitter; and
       a pair of termination resistors each having two terminals, one terminal of each resistor connected to the dual outputs of the slower transmitter and the other terminals of resistors connected to the dual outputs of the faster transmitter.

11. The computer system of claim 10 wherein the slower transmitter has a SE0 input terminal that, when asserted, causes the dual outputs of the slower transmitter to be in a logic low state.

12. The computer system of claim 11 wherein the dual output of the faster transmitter can be disabled by deasserting an output enable signal to said faster transmitter.

13. The computer system of claim 12 wherein the peripheral device transmits using the faster transmitter by asserting the SE0 input terminal of the slower transmitter so that the resistors provide parallel termination.

14. The computer system of claim 13 wherein the peripheral device transmits using the slower transmitter by disabling the dual outputs of the faster transmitter and the resistors provide serial termination.

15. The computer system of claim 13 wherein the resistors function as pull down parallel resistors.

16. The computer system of claim 14 wherein said USB host/controller has a receiver that can receive data transmitted from the peripheral device's slower or faster transmitter.

17. The computer system of claim 16 wherein the USB host/controller also has dual output faster and slower transmitters and the faster transmitter in the host/controller also has an SE0 input terminal that, when asserted, forces both output signals low and when the peripheral device transmits data using its faster transmitter, the host/controller asserts the SE0 input terminal of its slower transmitter.

18. A USB compatible device, comprising:
- a first transmitter with differential output signals and having a single ended zero input control line that, when asserted, forces both differential output signals low;
- a second transmitter with dual output signals and having an output enable control line that, when deasserted, forces both output signals to a high impedance state; and
- a pair of multi-purpose termination resistors electrically connected between the output signals of said first and second transmitters, so that the multi-purpose termination resistors provide serial termination when said first transmitter is used to transmit data and provide parallel termination when said second transmitter is used to transmit data;
- wherein, when asserted, said single ended zero input causes said first transmitter to be used to form the parallel termination.

19. The USB compatible device of claim 18 wherein said pair of multi-purpose termination resistors are in the range of approximately 10 to 44 ohm resistors.

20. The USB compatible device of claim 18 wherein said pair of multi-purpose termination resistors are in the range of approximately 29 to 44 ohm.

21. A method of transmitting data between a pair of electrical devices at one of two data rates, comprising:

- if one data rate is desired, disabling the output of a first transmitter and transmitting data through a second transmitter coupled to the first transmitter via a termination device that provides serial termination when the second transmitter is used to transmit data; or

- if another data rate is desired, forcing the output signals of the second transmitter low and transmitting data from the first transmitter with the termination device providing parallel termination.

22. The method of claim 21 wherein the first and second transmitters have dual output signals and the termination device comprises a pair of resistors.

* * * * *